June 6, 1967    A. LANDRY    3,323,837
POWERED, LOAD EJECTING WHEELBARROW
Filed Aug. 2, 1965    2 Sheets-Sheet 1

INVENTOR.
ALFRED LANDRY
BY
Knox & Knox

June 6, 1967 A. LANDRY 3,323,837
POWERED, LOAD EJECTING WHEELBARROW
Filed Aug. 2, 1965 2 Sheets-Sheet 2

INVENTOR.
ALFRED LANDRY
BY Knox & Knox

United States Patent Office 3,323,837
Patented June 6, 1967

3,323,837
POWERED, LOAD EJECTING WHEELBARROW
Alfred Landry, Lemon Grove, Calif., assignor to Grove Automation Company, Inc., San Diego, Calif., a corporation of California
Filed Aug. 2, 1965, Ser. No. 476,260
6 Claims. (Cl. 298—2)

The present invention relates to load carrying vehicles and more specifically to a powered, load ejecting wheelbarrow.

The primary object of this invention is to provide a wheelbarrow having a load carrying pan which is tipped up by power operated means to empty the load and incorporating a novel linkage which, when the pan passes a particular point in its travel, causes a sudden drop and additional tilting of the pan to eject the load.

Another object of this invention is to provide a wheelbarrow which is power driven to facilitate maneuvering of heavy loads, the powered dumping action making the capacity of the wheelbarrow much greater than that of a conventional hand operated type.

Another object of this invention is to provide a powered wheelbarrow which is controlled entirely from the operator's position at the handles, the load being dumped at the end remote from the handles to avoid possible injury to the operator.

The construction and operation of the wheelbarrow are illustrated in the drawings, in which.

Similar characters of reference indicate similar or identical elements and portions throughout the specification and throughout the views of the drawing.

Figure 1:
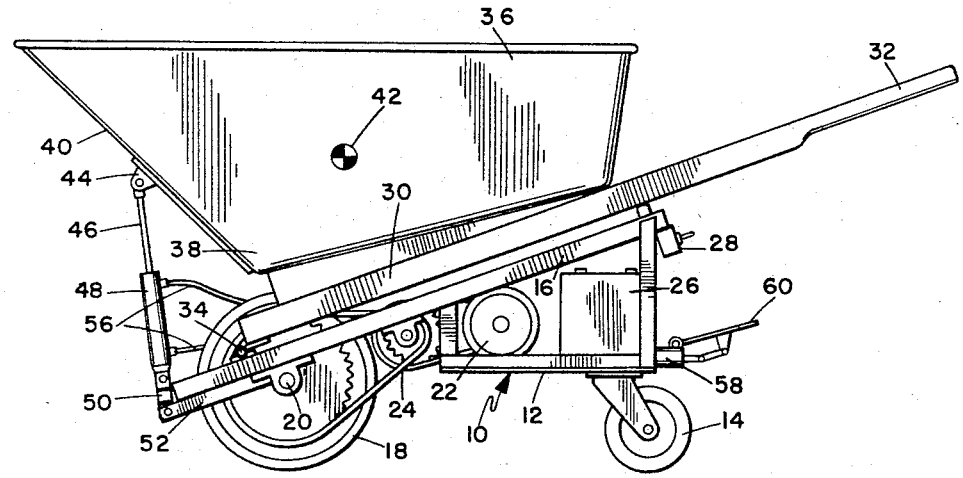
FIGURE 1 is a side elevation view of the wheelbarrow in the loading or moving position.

The wheelbarrow has a carriage 10 with a platform 12 supported on a pair of castering wheels 14 at the rear end, the upper part of the carriage having forwardly and downwardly inclined frame rails 16 between which is a large driven front wheel 18 mounted on a transverse axle 20. On the platform 12 is a motor 22 connected to the front wheel 18 by a reduction drive 24, or similar power transfer means, the motor being powered by a battery 26, or other power source depending on the type of motor used. A control switch 28 is mounted in an accessible position at the upper rear end of frame rail 16, to provide forward, reverse and off control of motor 22, such controls being well known.

Mounted on top of frame rails 16 are support rails 30 having rearwardly extending handles 32, the forward ends of the support rails being attached to said frame rails by hinges 34 pivotal on a common transverse axis adjacent axle 20. Fixed to the top of support rails 30 is a load carrying container or pan 36, preferably of somewhat conventional wheelbarrow configuration with a deep forward portion 38 and a forwardly and upwardly inclined front wall 40. The pan 36 is positioned so that the loaded center of gravity, indicated at 42, is well behind the hinges 34.

On the front wall 40 is a lug 44 to which is connected the piston rod 46 of an actuating jack 48, or comparable linear actuator.

Figure 4:
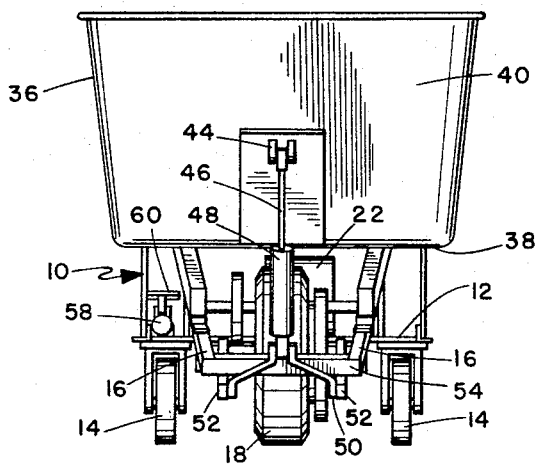
FIGURE 4 is an end elevation view as taken from the left end of FIGURE 1.

The other end of jack 48 is coupled to a yoke 50, the ends of which are pivotally attached to the forward ends of a pair of laterally spaced links 52. The rear ends of links 52 are pivoted on axle 20, or on other suitable hinges, the axle being conveniently positioned for the purpose, so that the links swing in generally vertical planes. Fixed between the forward ends of frame rails 16 is a cross bar 54 which limits the upward travel of links 52 and thus acts as a stop. Jack 48 is connected by hoses 56 to a control unit, illustrated as a hydraulic pump 58 mounted on platform 12, said cylinder having a foot pedal 60 by which the pressure can be pumped up. The hoses are omitted from FIGURE 4 for clarity. The arrangement is similar to that used in many types of fluid operated jacks, hoists and the like, the working jack usually being extended or retracted by pumping the actuating cylinder and being released by a pressure return or bleed on the cylinder or in the fluid lines. Such systems are readily available and need not be described in detail. Alternatively the jack could be a reversible electric screw jack operated from battery 26, the specific mechanism not being important.

The exact structure and materials of the wheelbarrow can vary considerably to suit particular load capacities and specialized uses of the unit.

Figure 2:
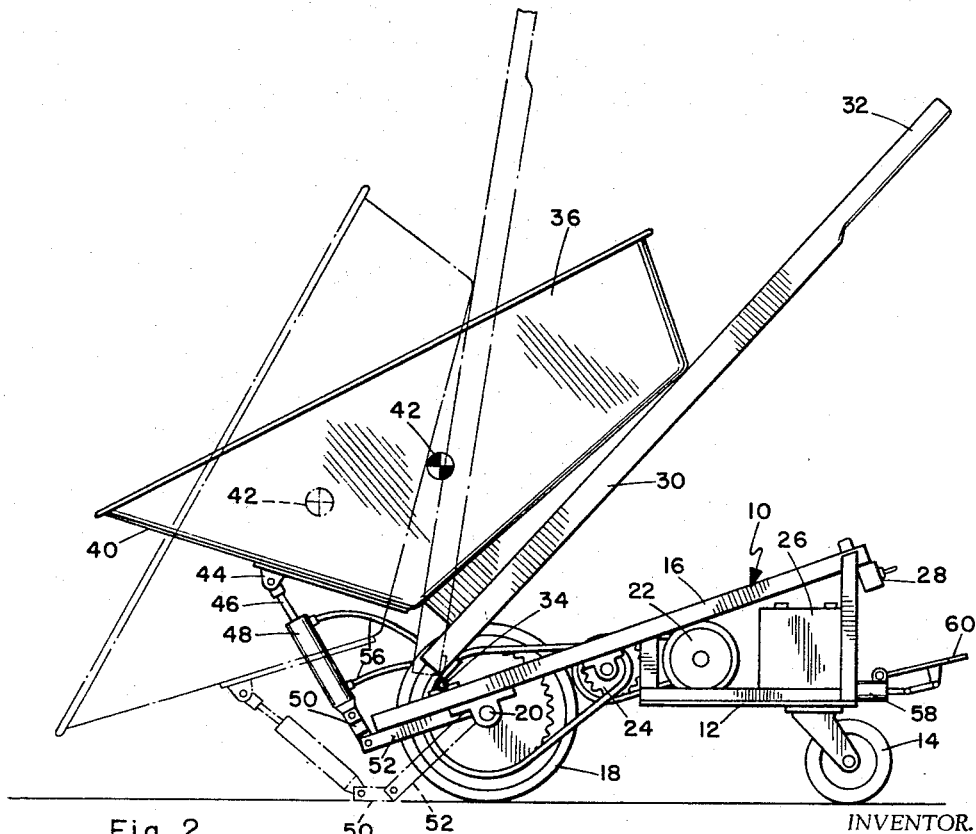
FIGURE 2 is a side elevation view showing the dumping and ejection action.
Figure 3:
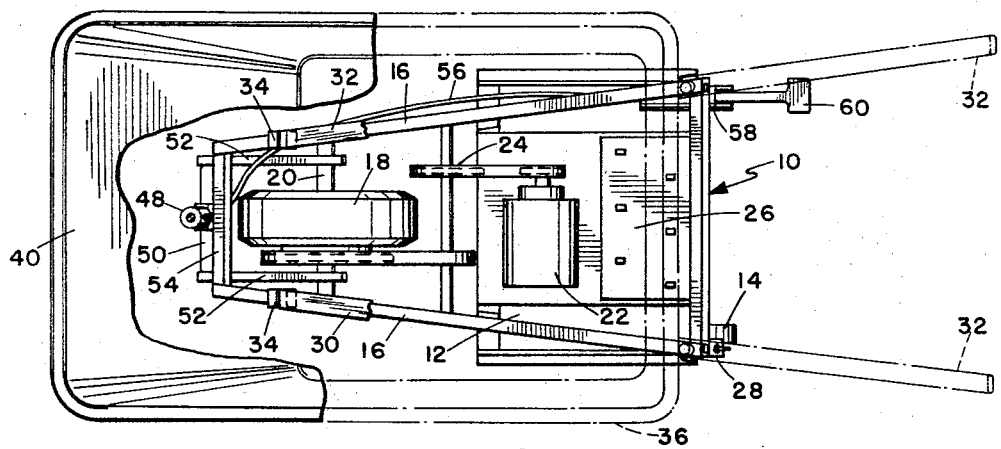
FIGURE 3 is a top plan view with portions cut away to reveal the mechanism.

In the rest position with the pan 36 lowered and support rails 30 resting on the frame rails 16, the wheelbarrow can be loaded by any suitable method. With the front wheel 18 being driven by motor 22 the wheelbarrow can be moved to any location required, the effort required to maneuver on the castering wheels 14 by manually steering with handles 32 being minimized. At the dumping location the wheelbarrow is stopped and foot pedal 60 is operated to retract piston rod 46 into jack 48, which pulls down the forward end of pan 36 and and tilts the pan about hinges 34. This action is continued until the center of gravity 42 is vertically above the axis of hinges 34, as indicated in the full line position in FIGURE 2. As soon as the center of gravity moves slightly beyond this position the weight of the pan, accentuated in practice by the load, forward of the hinges will cause the links 52 to drop away from cross bar 54 until they strike the ground, as indicated in broken line in FIGURE 2. This sudden drop and impact will cause the load to be ejected very efficiently from the pan, the inclined front wall 40 forming an ejection ramp.

When the load is dumped the handles 32 can be pulled down to lower the pan until links 52 strike the cross bar 54, then the jack 48 is released to complete lowering of the pan.

Since the jack is required for only the initial part of the pan raising action, a relatively short stroke jack can be used and the pumping action is minimized. In the sudden dropping action, which performs the load ejection, the connection of the links 52 and yoke 50 enables the jack to follow the motion without further retraction. It will be evident that the load ejecting mechanism is adaptable to other vehicle configurations, such as heavy duty types on which the operator can ride, or even manually propelled types for special purposes.

It is understood that minor variation from the form of the invention disclosed herein may be made without departure from the spirit and scope of the invention, and that the specification and drawing are to be considered as merely illustrative rather than limiting.

I claim:
1. A load handling vehicle, comprising:
 a wheeled carriage;
 a load carrying pan pivotally attached to said carriage;
 link means having a pivotal connection with said carriage to swing downwardly therefrom and being capable of only limited upward travel;
 actuating means connected between said link means and said pan on one side of said pivotal connection, said actuating means being contractible to tilt said pan to such position that the center of gravity of the pan is beyond a point vertically above the pivotal axis of said pivotal connection, said pan and said link means being capable of pivoting downwardly under the force of gravity for ejecting a load from said pan.

2. A load carrying vehicle, comprising:
a wheeled carriage;
a load carrying pan having hinge means attached to said carriage;
link means pivotally attached to said carriage to swing downwardly therefrom;
a linear actuator connected between the said pan and said link means;
means to retract said actuator and tilt said pan about said hinge means until the load center of gravity passes beyond the hinge axis, whereby said pan and said link means drop suddenly for ejecting a load.

3. A load carrying vehicle according to claim 2 and including handles extending from said pan remote from said hinge means.

4. A load carrying vehicle according to claim 2 and including:
a transverse axle on said carriage adjacent said hinge means;
one end of said link means being pivotal on said axle; and
at least one driven wheel mounted on said axle.

5. A load carrying vehicle, comprising:
a wheeled carriage having a forward end;
said carriage having upper frame rails inclined downwardly to said forward end;
a load carrying pan having hinges adjacent the forward end thereof attached to said frame rails;
forwardly extending link means pivotally connected to said carriage to swing downwardly therefrom;
stop means on said carriage limiting the upward travel of said link means;
a linear actuator connected between the hinged end of said pan and said link means;
means to retract said actuator and tilt said pan about said hinges until the load center of gravity of said pan passes forward of the hinges, whereby said pan and said link means drop suddenly for ejecting a load.

6. A load carrying vehicle according to claim 5, wherein said stop means comprises a cross bar interconnecting the forward ends of said frame rails, said link means being mounted below said frame rails and bearing upwardly against said cross bar.

References Cited

UNITED STATES PATENTS

| | | | |
|---|---|---|---|
| 1,936,528 | 11/1933 | Shunk | 298—17.5 |
| 2,424,670 | 7/1947 | Shimer. | |
| 2,704,227 | 3/1955 | Sidler | 298—19 |
| 2,770,491 | 11/1956 | Perko. | |
| 2,918,133 | 12/1959 | Ericsson. | |

FOREIGN PATENTS 756,898  9/1956  Great Britain.

BENJAMIN HERSH, *Primary Examiner.*

RICHARD J. JOHNSON, *Examiner.*